March 12, 1968  H. BOHN ET AL  3,372,702
METHOD AND APPARATUS FOR MAKING AND MANIPULATING
CIGARETTES AND SIMILAR ROD-SHAPED ARTICLES
Filed March 26, 1964  5 Sheets-Sheet 1

INVENTORS:
HORST BOHN
KARL-HEINZ SCHLÜTER

BY

Michael J. Striker
ATTORNEY

March 12, 1968 H. BOHN ETAL 3,372,702
METHOD AND APPARATUS FOR MAKING AND MANIPULATING
CIGARETTES AND SIMILAR ROD-SHAPED ARTICLES
Filed March 26, 1964 5 Sheets-Sheet 3

INVENTORS:
HORST BOHN
KARL-HEINZ SCHLÜTER
BY
Michael J. Striker
ATTORNEY

FIG. 9

United States Patent Office 3,372,702
Patented Mar. 12, 1968

3,372,702
METHOD AND APPARATUS FOR MAKING AND MANIPULATING CIGARETTES AND SIMILAR ROD-SHAPED ARTICLES
Horst Bohn, Hamburg, and Karl-Heinz Schlüter, Hamburg-Bergedorf, Germany, assignors to Hauni-Werke Korber & Co. K.G., Hamburg-Bergedorf, Germany
Continuation-in-part of application Ser. No. 822,510, June 24, 1959. This application Mar. 26, 1964, Ser. No. 354,900
Claims priority, application Germany, June 28, 1958, H 33,677; Aug. 25, 1958, H 34,162
12 Claims. (Cl. 131—94)

ABSTRACT OF THE DISCLOSURE

An apparatus and method for making cigarettes wherein a continuous cigarette rod is severed into double lengths, moved sideways and severed into unit lengths, separated without touching the severed ends and has double filter mouthpieces inserted and attached between the ends, after which the newly joined double cigarette is severed into unit cigarette lengths at the mouthpiece.

---

This is a continuation-in-part of our application Ser. No. 822,510, filed June 24, 1959, and now abandoned.

The present invention relates to the manufacture of cigarettes and similar rod-shaped articles, and particularly to a method and apparatus for the production of filter cigarettes.

In the production of filter cigarettes, proper handling of comparatively short cigarette rods and/or filter mouthpieces presents serious problems. Thus, the wrappers of such rod-shaped articles are likely to undergo deformation which affects the sales appeal of the ultimate product, cigarette rods are likely to lose some tobacco so that the ends of tobacco-containing portions of filter cigarettes are not packed as tightly as the remaining zones thereof, the joints between the tobacco-containing portions and the filter mouthpieces are likely to leak, kink or break, and it is difficult to manipulate such short rod-shaped articles at very high speeds which are desirable in modern mass-producing machines.

In accordance with certain more recent proposals, cigarette rods and filter mouthpieces of multiple unit length are assembled into filter cigarettes of multiple unit length, and such assemblies are severed to yield filter cigarettes of unit length. The present invention is concerned with improvements in such recent methods and apparatus for the production of filter cigarettes.

It is an important object of our invention to provide a method of making and manipulating cigarettes according to which at least one end portion of each cigarette is not subjected to any, or is not subjected to appreciable mechanical stresses which could cause the tobacco particles to escape or which would cause undesirable compacting of tobacco and/or excessive deformation of the paper tube which surrounds the tobacco filler.

Another object of the invention is to provide a method of the just outlined characteristics which is especially suited for the production and manipulation of filter cigarettes because the cigarettes are not likely to leak, kink, bend or break at the joint between the filter mouthpiece and the tobacco-containing portion.

A further object of the invention is to provide a method of the above outlined characteristics according to which at least one end face of each cigarette need not be touched by any mechanical devices all the way from the point where a cigarette of unit length is formed and up to and beyond the point where filter cigarettes are stacked in trays, boxes, packages or other types of receptacles.

An additional object of the instant invention is to provide a novel method of severing a continuous cigarette rod into cigarettes of ultimate length or multiple unit length without subjecting at least one end face of each cigarette to any such stresses which could cause escape of tobacco and/or excessive deformation or destruction of the wrapper.

A concomitant object of the invention is to provide a simple and inexpensive apparatus for carrying out the method of our invention.

Still another object of the invention is to provide an improved conveyor which is capable of separating or spreading aligned cigarettes of unit length or multiple unit length without subjecting at least one end face of each cigarette to any mechanical stresses.

A further object of the invention is to provide a cigarette machine which embodies a conveyor of the just outlined characteristics.

An additional object of the invention is to provide a cigarette machine which is especially suited for the production of filter cigarettes and which may be operated at very high speeds so that its output depends mainly on the capacity of the stacking and storing apparatus which receive the filter cigarettes.

Another object of the invention is to provide a filter cigarette machine of the above outlined characteristics which is constructed and assembled in such a way that the number of rejects (i.e., the number of damaged or destroyed filter cigarettes) is reduced to a minimum, which can be operated in a fully automatic way with little or no supervision, and which may be readily combined with conventional machines for the production of cigarette rods and filter mouthpieces, and/or with devices for stacking cigarettes with or without filter mouthpieces.

A further object of the invention is to provide a filter cigarette machine which may be coupled directly with a cigarette rod making machine with a filter rod making machine, or which may receive cigarette rods and filter mouthpieces from hoppers, magazines or similar sources of properly stacked rod-shaped articles.

Another object of the invention is to provide a filter cigarette machine wherein the cigarette rods are manipulated with a minimum of axial (endwise) movement so that such rods are not likely to lose tobacco on their way through the cutting, assembling, wrapping, heating, inverting and other stations.

With the above objects in view, one feature of our invention resides in the provision of a method of making and manipulating cigarettes, particularly filter cigarettes, which comprises the steps of forming a continuous cigarette rod by wrapping a paper web around a tobacco filler, moving the thus obtained cigarette rod endwise, consecutively severing this continuous cigarette rod at longitudinally spaced points to form cigarette rods of multiple unit length and deflecting each freshly obtained cigarette rod sideways, preferably in such a way that the rods of multiple unit length advance in a single file and in a direction substantially at right angles to the longitudinal extensions thereof, consecutively severing such rods to form rows of axially aligned cigarettes whereby the cigarettes of each row have closely adjacent inner end faces, and shifting the aligned cigarettes in consecutive rows away from each other to thereby increase the distances between the respective end faces.

In accordance with a very important feature of our invention, such shifting of cigarettes in consecutive rows may be effected without subjecting the inner end faces of the cigarettes to mechanical stresses which could cause particles of tobacco to be loosened or the paper tube to become deformed while the cigarettes are being shifted in directions away from each other. For example, such shifting of cigarettes may be effected by pulling the cigarettes away from each other, i.e., by subjecting the cigarettes to shifting forces which act thereon in zones other than the end faces thereof.

When the method of our invention is utilized in the producton of filter cigarettes, filter mouthpieces of multiple unit length may be inserted into gaps between the spaced-apart end faces of aligned cigarettes, whereupon the aligned cigarettes are moved toward each other so that their end faces come in actual abutment with the respective filter mouthpieces, and each filter mouthpiece is cut in half after a wrapper of paper or similar wrapper material is applied thereabout and about the adjacent end portions of the respective cigarettes. In accordance with this method, one can obtain filter cigarettes wherein the density of tobacco filters in immediate proximity of the filter mouthpiece is the same as in the remainder of the tobacco-containing portion because each cigarette is manipulated with a view to avoid subjecting its inner end face (i.e., that end face which is to abut against a filter mouthpiece) to any mechanical stresses such as could cause escape of tobacco particles, excessive deformation of the wrapper which is applied around the respective end portion of the cigarette, excessive compacting of tobacco in the respective end portion, or any other stresses which might adversely affect the appearance, strength and/or quality of the ultimate product.

The apparatus of our invention preferably comprises a conveyor including pairs of conical drums which lead aligned cigarettes of consecutive rows in divergent paths so that the distance between the end faces of the cigarettes increases and that the resulting gaps may receive filter mouthpieces of multiple unit length.

The conveyor supports the paper tubes of cigarettes so that the end faces of the cigarettes need not be touched by any mechanical means while the cigarettes advance in divergent paths. In other words, once the cigarette rods of multiple unit length advance past one or more knives which sever them to form one or more shorter cigarettes, one end of each shorter cigarette need not come in contact with any solid body other than the end face of a filter mouthpiece.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

Figure 1:
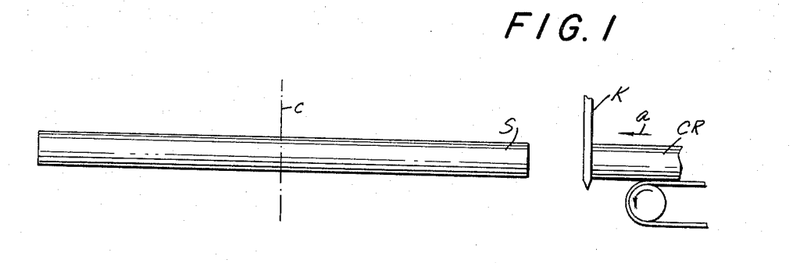
FIG. 1 is a side elevational view of a continuous cigarette rod and of a cigarette rod of double unit length, which latter is about to be severed to yield two cigarettes of unit length.
Figure 2:
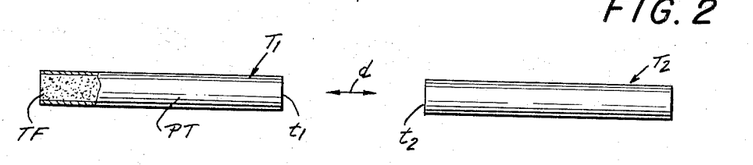
FIG. 2 illustrates two cigarettes obtained on severing of the rod of double unit length, the cigarettes being spaced axially to provide a gap for a filter mouthpiece of double unit length.

Referring to the drawings, and first to FIG. 1 there is shown a cigarette rod S of multiple unit length which may be severed to yield shorter sections or cigarettes of unit length. In the illustrated embodiment, the rod S is of double unit length; more particularly, its length is twice the length of the tobacco-containing portion of a filter cigarette. Such cigarette rods S may be fed consecutively through a suitable chute 2, shown in FIG. 6, so that each thereof advances in a direction transversely to its axis or, alternatively, a continuous cigarette rod CR issuing lengthwise (arrow $a$) from a cigarette rod former (not shown) is being severed by a knife K at longitudinally spaced points to yield cigarette rods S of multiple unit length which are thereupon advanced in a direction at right angles to their axes to form a single file of cigarette rods advancing in a direction indicated by the arrow $b$. Each consecutive rod S is then severed along the phantom line $c$ (see the knife 3 in FIG. 6) to yield two cigarettes $T_1$, $T_2$ of unit length (FIG. 2), and this cutting step takes place while the single file of rods S continues to advance in the direction indicated by arrow $b$. The distance between the thus obtained pairs of axially aligned cigarettes $T_1$, $T_2$ is then increased (arrow $d$) in a novel way, namely, so that their inner end faces $t_1$, $t_2$ need not be touched by any solid bodies, whereby the distance between the cigarettes $T_1$, $T_2$ increases sufficiently to provide a gap $e$ whose width at least equals but preferably exceeds the axial length of a filter mouthpiece F of double unit length. The spreading instrumentalities, not shown in FIGS. 1–5, do not come in contact with the tobacco fillers TF of the cigarettes $T_1$, $T_2$ but solely with the paper tubes PT which surround the respective fillers. In other words, the end faces $t_1$, $t_2$ remain untouched and, therefore, the cigarette $T_1$ and $T_2$ is not likely to lose tobacco at the end which is to be connected with a filter mouthpiece.

Figure 3:
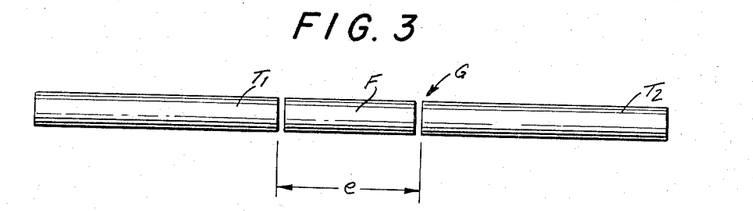
FIG. 3 illustrates a group of rod-shaped articles including two cigarettes and a filter mouthpiece of double unit length.

The gap $e$ thereupon receives a filter mouthpiece F of double unit length, see FIG. 3, so that the cigarettes $T_1$, $T_2$ form therewith a group G of three coaxial rod shaped articles wherein the filter mouthpiece is located between the untouched end faces $t_1$, $t_2$. The cigarettes $T_1$, $T_2$ are then moved axially and toward each other (arrows $f$ in FIG. 4) so that their end faces $t_1$, $t_2$ now abut against the respective end faces of the filter mouthpiece F.

Figure 4:
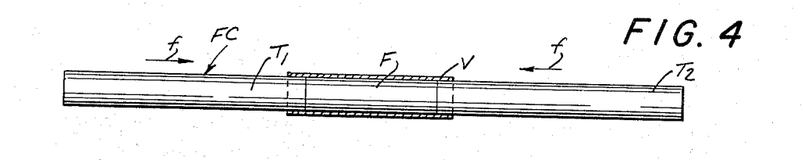
FIG. 4 illustrates a filter cigarette of double unit length.
Figure 5:
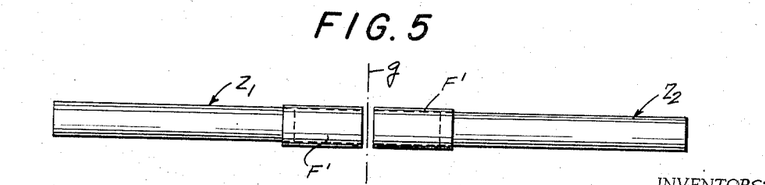
FIG. 5 illustrates two filter cigarettes of unit length which are obtained from the filter cigarette of FIG. 4.

In the next step, the machine in which the method is being carried out attaches to the group G an adhesive-coated wrapper V of paper or similar web material which is thereupon convoluted around the filter mouthpiece F and around the adjacent end portions of the cigarettes $T_1$, $T_2$ so as to form a filter cigarette FC of double unit length, see FIG. 4. This filter cigarette FC is then severed across the wrapper V midway between the ends of the filter mouthpiece F (see the line $g$ in FIG. 5) to yield two axially aligned filter cigarettes $Z_1$, $Z_2$ of unit length. One of the filter cigarettes $Z_1$, $Z_2$ is then reversed so that its filter mouthpiece F' is adjacent to the filter mouthpiece F' of the other filter cigarette whereby such cigarettes form a single file which may be conveyed into a stacking, storing or packaging machine in a manner to be described in connection with FIG. 8.

Figures 6, 7:
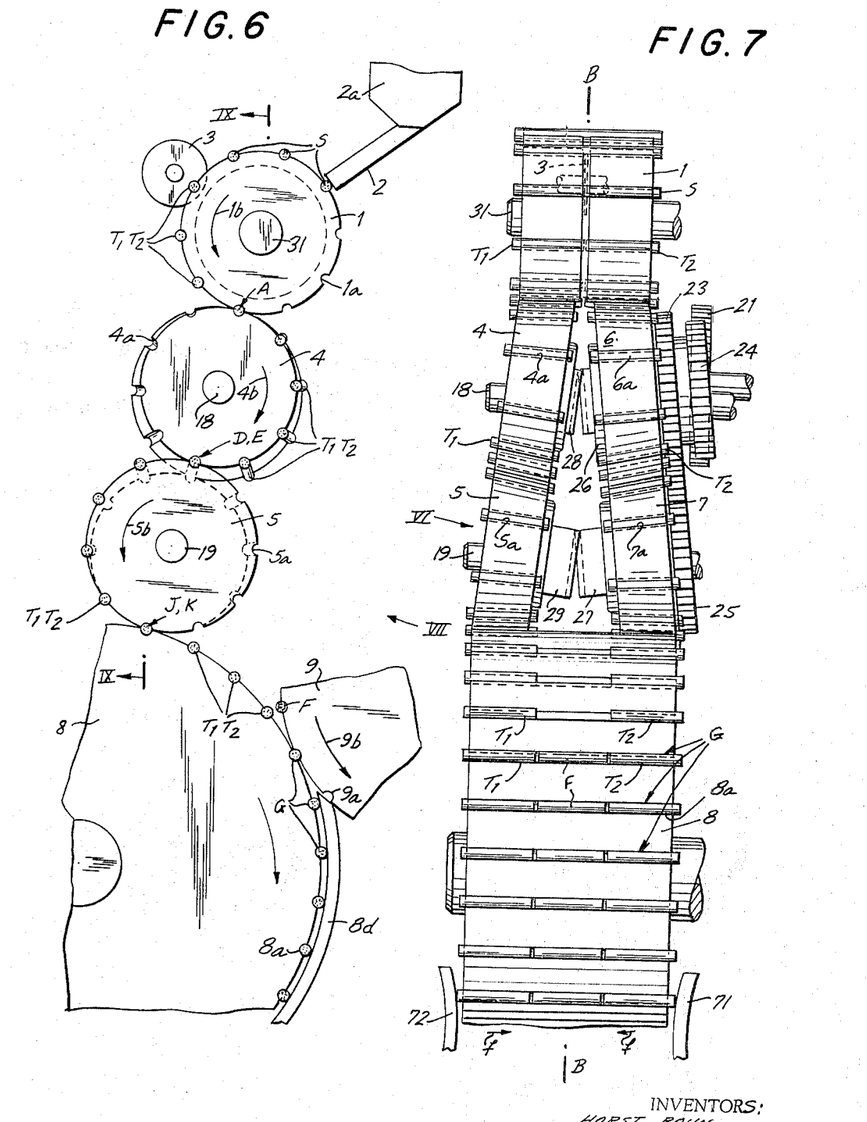
FIG. 6 is a fragmentary side elevational view of a filter cigarette machine which embodies one form of our invention, the view of FIG. 6 being taken from the left-hand side of FIG. 7, as seen in the direction indicated by arrow VI.
FIG. 7 is an end elevational view of the structure shown in FIG. 6 as seen in the direction indicated by arrow VII.

FIGS. 6 and 7 illustrate a portion of a filter cigarette machine which may be utilized in practicing the method of our invention. This machine comprises a first conveyor here shown as a rotary magazine drum 1 which is provided with axially parallel peripheral pockets or holders 1$a$ and which rotates in a counterclockwise direction (arrow 1$b$) past a feed station at which the pockets 1$a$ receive cigarette rods S of double unit length. This feed station accommodates an inclined chute 2 which receives cigarette rods from a suitable source here shown as a magazine or hopper 2a. The rods S are conveyed in a single file past a revolving disk knife 3 which severs each rod (see the phantom line c in FIG. 1) so that such rods yield pairs of axially aligned cigarettes $T_1$, $T_2$ of unit length.

The drum 1 delivers such pairs or rows of aligned cigarettes $T_1$, $T_2$ to a first transfer station A at which the cigarettes are transferred into peripheral pockets or holders 4a, 6a of a second conveyor including two divergent frustoconical spreader drums 4, 6. These drums rotate about a shaft 18 whose axis is parallel with the axis of the drum 1, but the axes of the drums 4, 6 are inclined with reference to the axis of the shaft 18. FIG. 7 shows that the drums 4, 6 are mounted mirror symmetrically with reference to a plane B—B which intersects the magazine drum 1 midway between its end faces and which is perpendicular to the axis of the drum 1.

The drums 4, 6 respectively cooperate with two additional frustoconical drums 5, 6 which are provided with peripheral pockets 5a, 7a and which receive cigarettes $T_1$, $T_2$ at two transfer stations D, E. The drums 4, 6 rotate in a clockwise direction (see the arrow 4b in FIG. 6), and the drums 5, 7 rotate in a counterclockwise direction (arrow 5b). It will be noted that the drums 4, 5 and 6, 7 respectively taper in opposite directions. The conicity of these drums will determine the axial length of gaps e between the inner ends of the cigarettes $T_1$, $T_2$.

The drums 5, 7 deliver the cigarettes $T_1$, $T_2$ into peripheral pockets 8a provided on a third conveyor here shown as an assembly drum 8 whose axis is parallel with the axis of the drum 1. The transfer stations J, K between the drums 5, 7 and 8 are normally located in a plane which is common to the axes of the drums 1, 4, 5, 6, 7 and 8. The axial length of the drum 8 is sufficient to insure that each pocket 8a may accommodate a pair of axially spaced cigarettes $T_1$, $T_2$ plus a filter mouthpiece F of double unit length, such filter mouthpieces being fed consecutively by a supply drum 9 which is provided with axially parallel peripheral pockets or holders 9a and which rotates in a counterclockwise direction (arrow 9b). This drum may receive filter mouthpieces from a magazine 9c through a chute 9d (see FIG. 8) or from a suitable shuffling drum of well known construction whereon rows of two or more axially aligned filter mouthpieces may be condensed to form a single file.

Figure 8:
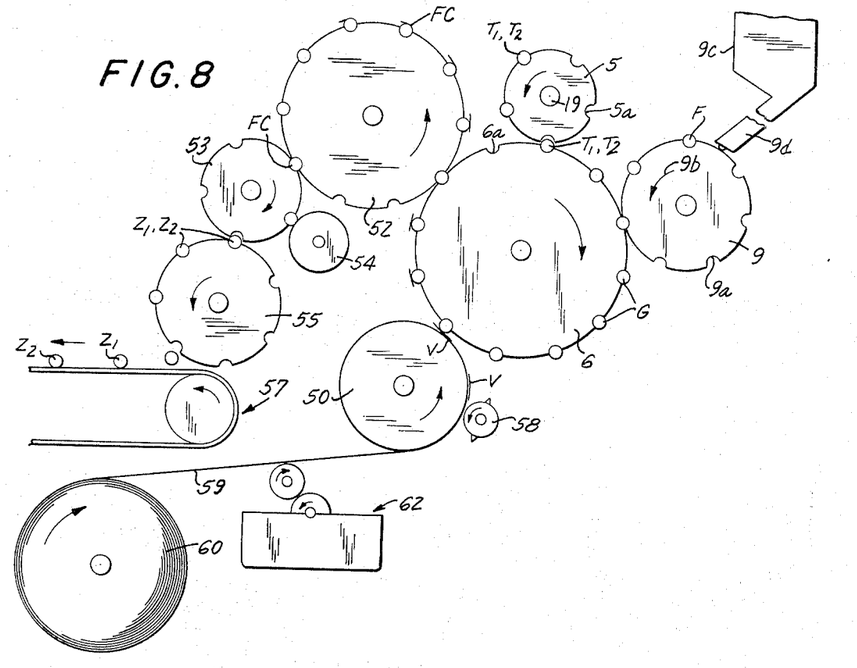
FIG. 8 is a fragmentary side elevational view of another part of the filter cigarette making machine.

The thus obtained groups G of cigarettes $T_1$, $T_2$ and filter mouthpieces F are conveyed past a wrapper applying drum 50, shown in FIG. 8, which applies a wrapper V to each consecutive filter mouthpiece F, and the wrappers are convoluted around the mouthpieces and around the adjacent end positions of the cigarettes $T_1$, $T_2$ while the groups G travel in the pockets of a wrapping drum 52 which receives consecutive groups from the drum 6. A satisfactory apparatus for convoluting the wrappers V around consecutive groups G is disclosed in U.S. Patent No. 2,740,409. The wrapping drum 52 delivers filter cigarettes FC of double unit length to a transfer drum 53 which cooperates with a rotary disk knife 54 serving to sever each wrapped filter cigarette FC of double unit length (see the line g in FIG. 5) so that each such cigarette FC yields two filter cigarettes $Z_1$, $Z_2$ of unit length. The cigarettes $Z_1$ are inverted in the pockets of a reversing drum 55 and are transferred with cigarettes $Z_2$ into the pockets of a take-off conveyor 57 to form a single file of filter cigarettes which may be advanced into a stacking device not shown.

The drum 50 cooperates with a rotary cutter 58 which severs a continuous web 59 of convoluted material stored on a supply reel 60. On its way toward the drum 50, the web 59 has one of its sides coated with a layer of adhesive which is applied thereto by a paster 62 of conventional construction.

It is clear that the drums shown in FIGS. 6–8 are provided with suitable arcuate shields and/or with suction ducts to retain the rod-shaped articles in the respective pockets. Such shields were omitted in FIGS. 7–10 for the sake of clarity, but FIG. 6 shows a portion of a shield 8d which retains the groups G in the pockets 8a.

Figure 9:
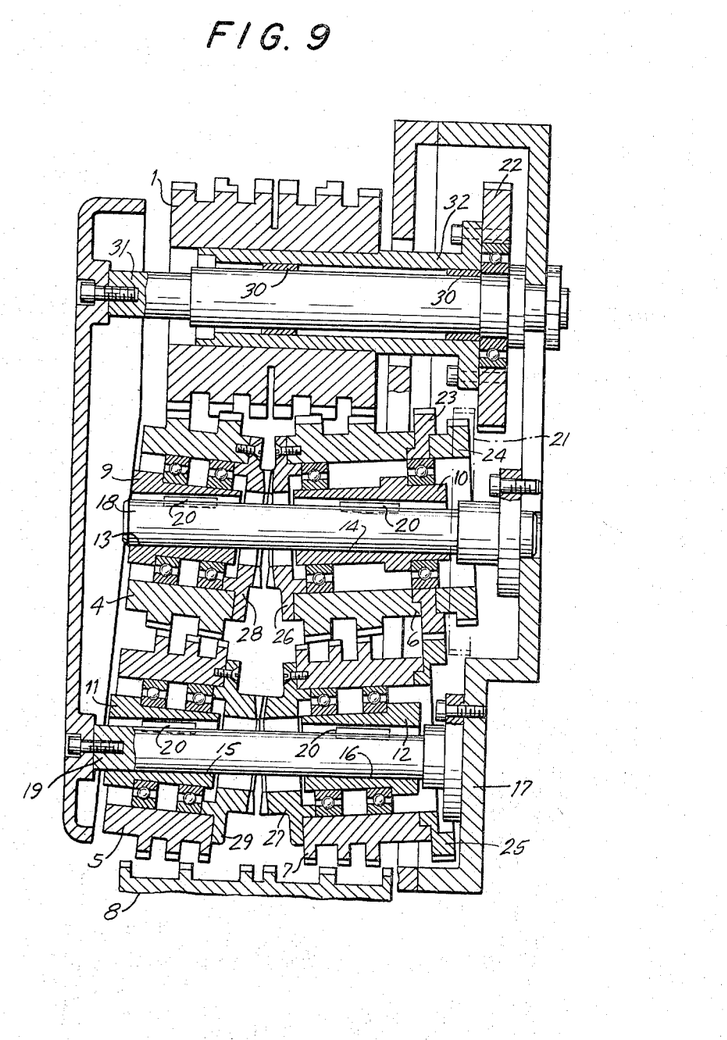
FIG. 9 is an enlarged section as seen in the direction of arrows from the line IX—IX of FIG. 6.

Referring to FIG. 9, the drums 4, 6 and 5, 7 of the second conveyor are mounted to rotate about bearing sleeves 9, 10 and 11, 12. These sleeves are respectively provided with inclined bores 13, 14 and 15, 16 for shafts 18 and 19. It will be noted that the sleeves 9, 10 are fixedly attached to the shaft 18 by keys 20 and that similar keys 20 connect the sleeves 11, 12 with the shaft 9. The axes of the drums 4, 6 make small acute angles with the axis of the shaft 18.

A driver gear 21, located behind the plane of FIG. 9 and indicated by dot-dash lines, serves to drive the drums 4–7. This gear 21 is provided with helical teeth and is driven by the prime mover of the filter cigarette machine. It meshes with a gear 24 which in turn drives the drum 6 through an intermediate gear 23. The gear 23 also drives a gear 25 which is fixedly secured to the drum 7. The drums 6, 7 carry bevel gears 26, 27 which mesh with bevel gears 28, 29 on the drums 4 and 5.

The drum 1 is rotatable on needle bearings 30 surrounding a shaft 31 which is fixedly mounted in a frame 17. This drum 1 is provided with a coaxial sleeve 32 which surrounds the bearings 30 and which is connected with a gear 22 meshing with the driver gear 21 through a suitable gear train, not shown.

The drum 8 and the other drums shown in FIG. 8 may be driven by the gear 21 or by another driver element in a manner similar to that described in connection with the drum 1.

The peripheral speeds of the drums 1, 4–7, 8 and 9 are the same so that the transfer of cigarette rods S, cigarettes $T_1$, $T_2$, filters F and groups G may take place without any damage thereto. FIG. 7 shows portions of two cams 70, 71 which are adjacent to the end faces of the drum 8 and whose cam faces are inclined in such a way that the cigarettes $T_1$, $T_2$ are compelled to move inwardly and into actual abutment with the filter mouthpieces F before a group G reaches the drum 50. The cams 71, 72 prevent the formation of gaps between the tobacco-containing portions $T_1$, $T_2$ and filter mouthpieces F' of filter cigarettes $Z_1$, $Z_2$.

The machine of FIGS. 6 to 9 operates as follows:

The magazine 2a discharges cigarette rods S of double unit length, and such rods descend through the chute 2 and enter consecutive pockets 1a to advance past the knife 3 and to yield pairs of axially aligned cigarettes $T_1$, $T_2$. At the station A, the cigarettes $T_1$, $T_2$ are respectively transferred into the pockets 4a, 6a so as to move in divergent paths away from each other, see FIG. 7. At the stations D, E, the cigarettes $T_1$, $T_2$ are respectively transferred into the pockets 5a, 7a of the drums 5, 7 and continue to move away from each other to reach the transfer stations J, K at which they enter the pockets 8a of the assembly drum 8. It will be noted that each pair of row of cigarettes $T_1$, $T_2$, obtained by severing a cigarette rod, S, enters the same pocket 8a but that such cigarettes are spaced sufficiently (see the gap e in FIG. 3) to provide room for a filter mouthpiece F of double unit length. Such filter mouthpieces are fed by the supply drum 9, and the thus obtained groups G are thereupon processed and treated in a manner as described in connection with FIG. 8.

Figure 10:
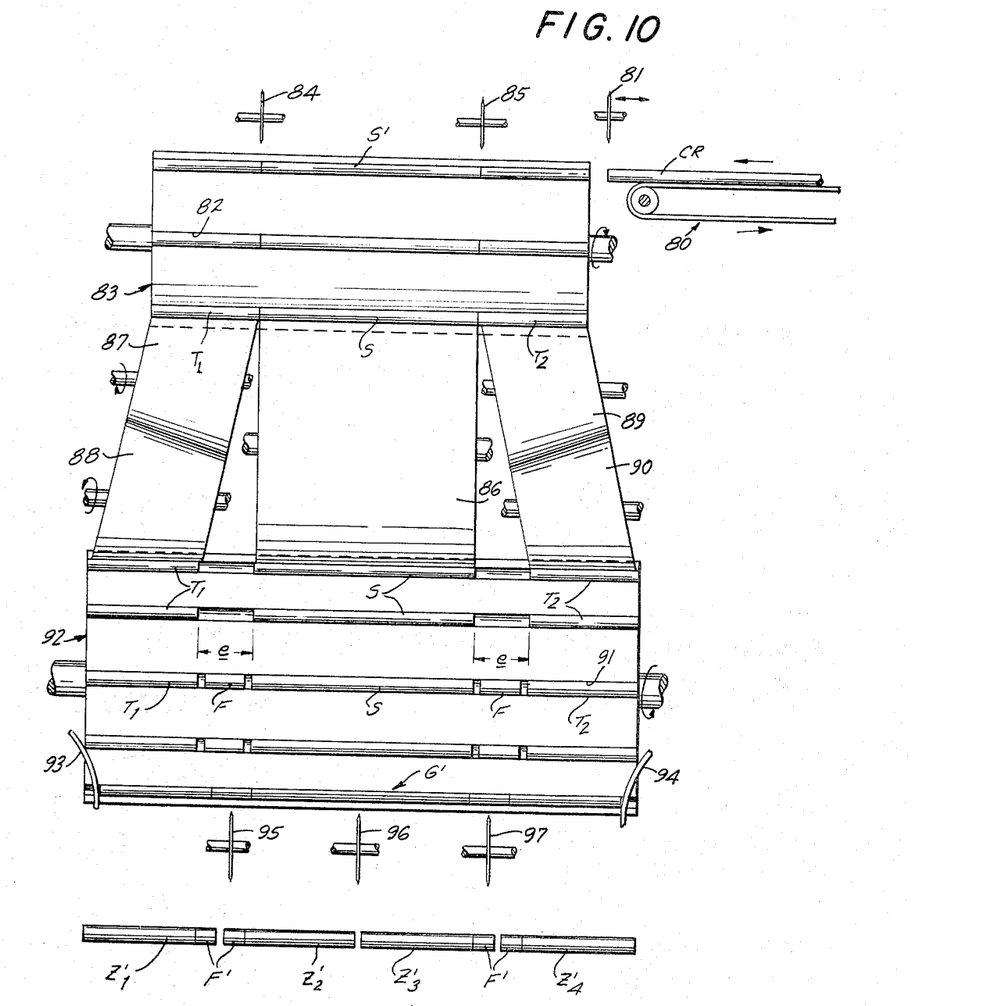
FIG. 10 is a fragmentary and elevational view of a modified filter cigarette machine which is directly coupled to a cigarette rod former and which is arranged to produce four filter cigarettes at a time.

FIG. 10 illustrates a modified apparatus for the practice of our method, and this apparatus is capable of simultaneously producing four filter cigarettes $Z_1'$–$Z_4'$ so that its output is twice the output of the apparatus shown in FIGS. 6–9.

A continuous cigarette rod CR is fed endwise by a conveyor 80 in a manner as disclosed, for example, in U.S. Patent No. 2,124,397, and this continuous rod CR is severed by an orbiting reciprocable knife 81 at longitudinally spaced points to yield cigarette rods S' of quadruple unit length. The rods S' are delivered into the pockets 82 of a rotary magazine drum 83 which advances such rods in a single file and in a direction at right angles to the axes of the rods so that the rods travel past two revolving disk knives 84, 85. These knives sever the rods consecutively so that each thereof yields a centrally located cigarette rod S of double unit length and two cigarettes $T_1$, $T_2$ of unit length. The rods S are transferred into the pockets of a centrally located drum 86 which is mounted midway between two pairs of conical drums 87, 88 and 89, 90. These pairs of conical drums respectively correspond to and perform the functions of the drums 4, 5 and 6, 7 shown in FIG. 7. The main difference is that the conicity of the drums 87, 88 and 89, 90 is greater because these drums must move the cigarettes $T_1$, $T_2$ away from each other to form not one but two gaps $e$ each of which will receive a filter mouthpiece F of double unit length. The drum 86 deposits the rods S into consecutive grooves 91 of an assembly drum 92, and each consecutive groove 91 further receives a pair of aligned but spaced cigarettes $T_1$, $T_2$ whereby the rod S occupies a central position at a distance $e$ from each of the cigarettes $T_1$, $T_2$. These gaps then receive filter mouthpieces F of double unit length, and such filter mouthpieces may be fed by two chutes of the type shown at $9d$ in FIG. 8. The thus formed groups G' (each comprising two cigarettes $T_1$, $T_2$, two filter mouthpieces F and a cigarette rod S) are thereupon advanced between two cams 93, 94 which cause the cigarettes $T_1$, $T_2$ to move in actual abutment with the filter mouthpieces F and which also cause the filter mouthpieces to move in actual abutment with the cigarette rod S.

In the next following operation (not shown), the groups G' are provided with pairs of wrappers one of which secures the left-hand filter mouthpiece F to the cigarette $T_1$ and to the cigarette rod S, and the other of which secures the right-hand filter mouthpiece F to the cigarette $T_2$ and to the cigarette rod S of the respective group whereby the resulting rod is a filter cigarette of quadruple unit length. Such cigarettes of quadruple unit length are severed by three knives 95, 96, 97 so that each thereof yields four filter cigarettes $V_1'-Z_4'$ of unit length. Two of these filter cigarettes are then inverted so that their filter mouthpieces F' form a single file with the filter mouthpieces F' of the noninverted cigarettes. If desired, one of the thus obtained single files of cigarettes is inverted again to ultimately obtain only one single file of filter cigarettes which may be led to a stacking device. The knives 95, 97 respectively sever the wrappers surrounding the left-hand and the right-hand filter mouthpieces F, and the knife 96 forms cuts across the centers of consecutive rods S.

A feature common to all embodiments of our invention is that the end faces of cigarettes or cigarette rods which come in abutment with filter mouthpieces need not be touched by any parts other than the knives so that each such end face is free of projecting tobacco particles. Also, the end portions of cigarettes and cigarette rods which are adjacent to such end faces are not likely to lose tobacco so that the density of the filler is uniform throughout the full length of the tobacco-containing portion of each filter cigarette. This is due to the fact that the spreading action (i.e., the shifting of cigarettes and/or cigarette rods axially of and from each other) is not effected by means of cams of the type used in many presently known filter cigarette machines (see, for example, U.S. Patent No. 2,858,046) but rather by conical drums or analogous spreading devices which engage the cigarettes in zones other than such end faces thereof which are about to move in abutment with filter mouthpieces. Another very important advantage of our method and apparatus is that the rods and cigarettes are conveyed in directions substantially at right angles to their axes and that the length of the path in which such cigarettes and cigarette rods advance from a magazine ($2a$ in FIG. 6) or from the point where they are severed from a continuous cigarette rod (see the knife 81 in FIG. 10) is very short so that the end portions of such cigarettes and cigarette rods are very unlikely to dissipate some of their contents. A sophisticated smoker will shun cigarettes with untight ends or filter cigarettes which tend to knick at the joint between the tobacco-containing portion and the filter mouthpiece, especially since a filter cigarette wherein the inner end of the tobacco-containing portion contains a loosely packed tobacco filler is likely to "leak" which is quite annoying to a smoker.

A further very important feature of our apparatus is that rods of multiple unit length are severed at a point (knife 3 of FIG. 6) which is closely adjacent to the point (drum 9) where the apparatus inserts filter mouthpieces so that there is little opportunity for the shorter rods to lose some tobacco prior to forming the groups G.

Figure 11:
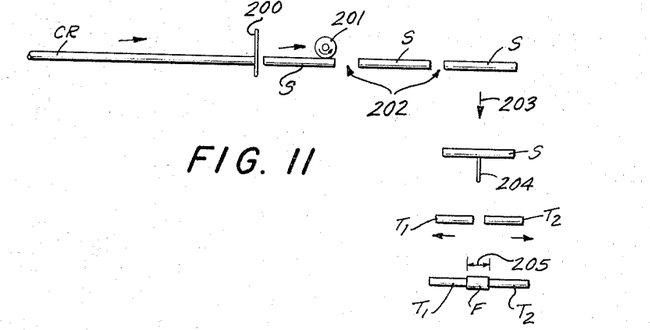
FIG. 11 illustrates a system for severing a continuous cigarette rod to obtain rods of multiple unit length for use in the apparatus of FIGS. 6–9 or 10.

FIG. 11 illustrates schematically one method of severing a continuous cigarette rod CR to obtain cigarette rods S of multiple unit length. The rod CR advances endwise and is severed by a knife 200 to yield rods S of multiple unit length. These rods are accelerated by a revolving cam 201 so that they define gaps 202. The foremost rod S is then deflected sideways (arrow 203) and is severed by a knife 204 to yield two cigarettes $T_1$, $T_2$ of unit length. These cigarettes are then moved apart to form a gap 205 in the same way as described in connection with FIGS. 6 to 9. This gap receives a filter mouthpiece F of double unit length.

If desired, one of the cigarettes $T_1$, $T_2$ may travel in a path which is perpendicular to its axis. Thus, and referring to FIG. 10, this would mean that the cigarette $T_1$ could be conveyed by the drum 86 so that the apparatus would include a single set of conical drums 89, 90.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a method of assembling filter cigarettes, the steps of advancing a single file of parallel cigarette rods of quadruple unit length in a direction transversely to the axes thereof; consecutively severing each of the advancing cigarette rods at two points to form pairs of coaxial cigarette rods of unit length and a cigarette rod of double unit length between each pair of coaxial cigarette rods of unit length whereby the rods of double unit length and the respective pairs of rods of unit length have closely adjacent end faces; increasing the distance between the rods of double unit length and the respective pairs of rods of unit length by subjecting consecutive pairs of rods of unit length to the action of spreading forces acting thereon in zones other than said end faces thereof whereby each rod of unit length defines with the respective rod of double unit length a gap of a width which at least equals the length of a filter mouthpiece of double unit length; inserting a filter mouthpiece of double unit length into each pair of consecutively formed coaxial gaps whereby each pair of rods of unit length forms with the respective rod of double unit length and with a pair of filter mouthpieces a group of rod shaped articles corresponding to a filter cigarette of quadruple unit length; applying adhesive-coated wrappers around each consecutive pair of aligned filter mouthpieces and around the adjacent portions of the respective rods; severing each consecutive pair of wrappers midway across the respective filter mouthpiece; and severing each consecutive rod of double unit length whereby each group yields four filter cigarettes of unit length.

2. In a method of assembling filter cigarettes, the steps of advancing a single file of parallel cigarette rods of quadruple unit length in a direction transversely to the axes thereof; consecutively severing each of the advancing cigarette rods at two points to form pairs of coaxial cigarette rods of unit length and a cigarette rod of double unit length between each pair of coaxial cigarette rods of unit length whereby the rods of double unit length and the respective pairs of rods of unit length have closely adjacent end faces; increasing the distance between the rods of double unit length and the respective pairs of rods of unit length by subjecting consecutive pairs of rods of unit length to the action of spreading forces acting thereon in zones other than said end faces thereof whereby each rod of unit length defines with the respective rod of double unit length a gap of a width which at least equals the length of a filter mouthpiece of double unit length; inserting a filter mouthpiece of double unit length into each pair of consecutively formed coaxial gaps whereby each pair of rods of unit length forms with the respective rod of double unit length and with a pair of filter mouthpieces a group of rod shaped articles corresponding to a filter cigarette of quadruple unit length; moving the consecutive pairs of rods of unit length into abutment with the respective pairs of filter mouthpieces and simultaneously moving such filter mouthpieces into abutment with the respective rods of double unit length; applying adhesive-coated wrappers around each consecutive pair of aligned filter mouthpieces and around the abutting portions of the respective rods; severing each consecutive pair of wrappers midway across the respective filter mouthpiece; and severing each consecutive rod of double unit length whereby each group yields four filter cigarettes of unit length.

3. In an apparatus for manufacturing filter cigarettes in which a rotary drum is provided in its periphery with axially extending pockets of a length sufficient to receive therein cigarette rods having a length equal to the length of two cigarettes, means for feeding individual cigarette rods of double unit length into the pockets of said rotary drum, a rotary knife arranged to cut said cigarette rods into two cigarettes while in the pockets of said rotary drum, two conical drums arranged in side-by-side relation for moving each of said two cigarettes, said conical drums being adjacent to said rotary drum to receive said cigarettes from said rotary drum and to transfer said two cigarettes through circuitous and divergent pathways simultaneously and in axially spaced relation to a conveyor arranged to move transversely with reference to the longitudinal extensions of said cigarettes, means for inserting a filter mouthpiece of double unit length into the space between each pair of said axially aligned cigarettes and for axially moving said cigarettes in abutment with the opposite ends of said filter mouthpiece, said two conical drums being mounted to rotate about separate oppositely extending axes inclined at an acute angle to the axis of said rotary drum, whereby said cigarettes will be moved through an annular distance of approximately 180° for being deposited on the conveyor in axially spaced relation.

4. In an apparatus for manufacturing filter cigarettes in which a rotary drum is provided in its periphery with axially extending pockets of a length sufficient to receive therein cigarette rods having a length equal to the length of two cigarettes, means for feeding individual cigarette rods of double unit length into the pockets of said rotary drum, a rotary knife arranged to cut said cigarette rods into two cigarettes while in the pockets of said rotary drum, two conical drums for each one of said two cigarettes arranged in side-by-side relation to receive said cigarettes from said rotary drum and to transfer said cigarettes through circuitous and divergent pathways simultaneously and in axially spaced relation to a conveyor arranged to move transversely with reference to the longitudinal extensions of said cigarettes, said conical drums having their tapers arranged in opposite directions and being positioned to diverge from said rotary drum toward said conveyor in such a manner that the circumferential surface zones at the receiving side and the discharge side of said pairs of conical drums are substantially parallel, said two conical drums for each cigarette being mounted to rotate about separate axes extending in opposite directions and at an acute angle to the axis of said rotary drum whereby said cigarettes will be moved through an angular distance of approximately 180° for being deposited on the conveyor in axially spaced apart relation, and means for inserting a filter mouthpiece of double unit length into gaps between each pair of said axially aligned cigarettes and for axially pushing said cigarettes in abutment with the opposite ends of said filter mouthpiece.

5. An apparatus for manufacturing filter cigarettes as set forth in claim 4, including a machine frame, stationary axles mounted fixedly in said machine frame, and bearing sleeves having inclined bores therein fixedly attached to said axles, said conical drums being rotatably mounted on said bearing sleeves, and driven gear means for rotating said conical drums.

6. In an apparatus for manufacturing filter cigarettes in which a rotary drum is provided in its periphery with axially extending pockets of a length sufficient to receive therein cigarette rods having a length equal to the length of two cigarettes, means for feeding individual cigarette rods of double unit length into the pockets of said rotary drum, a rotary knife arranged to cut said cigarette rods into two cigarettes while in the pockets of said rotary drum, two conical drums arranged in side-by-side relation, one for each of said two cigarettes, said conical drums being mounted to rotate about inclined axes extending oppositely and making acute angles with the axis of said rotary drum to receive said cigarettes from said rotary drum and to convey the said cigarettes through circuitous and divergent pathways simultaneously and in axially spaced relation, a rotary assembly drum having pockets of a length exceeding the length of the pockets in said rotary drum and arranged to rotate about an axis parallel to the longitudinal extensions of said cigarettes, means for inserting a filter mouthpiece of double unit length into the gap between each pair of said axially aligned cigarettes including a rotary carrier drum adjacent to the periphery of said assembly drum, and means for axially pushing said cigarettes in abutment with the opposite ends of said filter mouthpiece.

7. In an apparatus for assembling filter cigarettes, a rotary drum having axial pockets in its periphery each of a length approximating the length of two cigarettes, means for feeding individual cigarette rods of double unit length into consecutive pockets of said rotary drum, a rotary knife adjacent to the rotary drum and arranged to cut the cigarette rods into cigarettes of unit length while in the pockets of said drum, sets of conical drums arranged in pairs in side-by-side relation and mounted to rotate about separate axes extending at an acute angle to the axis of the rotary drum, the peripheries of one set of said conical drums being provided with cigarette receiving pockets adapted to mate with the pockets in the rotary drum to receive the cigarettes from the rotary drum, an assembly drum having pockets in its periphery of a length exceeding the length of pockets in the periphery of the rotary drum and having its pockets spaced circumferentially to mate with the pockets in another set of conical drums whereby said cigarettes will be deposited on the assembly drum and spaced axially one from the other, said sets of conical drums being mounted with their cone surfaces arranged oppositely so that they will assume parallel positions in the areas adjacent to the rotary and assembly drums, and means for depositing filter mouthpieces between the cigarettes on the assembly drum.

8. An apparatus for making and manipulating cigarettes, comprising first conveyor means arranged to advance a continuous cigarette rod endwise; first knife means adjacent to said conveyor means and arranged to sever the rod at longitudinally spaced points so as to form a series of consecutive cigarette rods of multiple unit length; second conveyor means arranged to receive and to convey consecutive cigarette rods of multiple unit length sideways so that such rods form a single file; second knife means adjacent to said second conveyor means and arranged to sever consecutive cigarette rods of multiple unit length, so that each such rod yields a plurality of cigarettes with closely adjacent end faces; and spreader means arranged to increase the distance between the end faces of cigarettes while the cigarettes advance sideways, said spreader means comprising a plurality of conveyors each arranged to receive from said second conveyor means one cigarette of each consecutive cigarette rod of multiple unit length, said conveyors being arranged to advance the respective cigarettes in divergent paths so that the distance between the end faces of aligned cigarettes increases while the cigarettes advance with the respective conveyors, each of said conveyors being a conical drum having peripheral holders for cigarettes and being arranged to support only the paper tubes of such cigarettes so that the end faces of the cigarettes remain untouched during movement thereof away from each other.

9. An apparatus for making and manipulating cigarettes, comprising first conveyor means arranged to convey a single file of cigarette rods of multiple unit length in a direction substantially at right angles to the longitudinal extensions of such cigarette rods; knife means adjacent to said conveyor means and arranged to sever each consecutive cigarette rod to form rows of aligned shorter cigarette rods whereby such shorter rods have closely adjacent end faces; and spreader means including a plurality of conveyors each arranged to receive one shorter rod of each consecutive row and to convey the respective shorter rod in a path which diverges from the path of the other shorter rods so that the distance between the shorter rods increases, said conveyors including pairs of conical drums which taper in opposite directions.

10. An apparatus as set forth in claim 9, wherein the conveyors of said spreader means are arranged to engage the respective shorter rods in zones other than said end faces.

11. An apparatus as set forth in claim 9, further comprising a source of cigarette rods of multiple unit length arranged to discharge such rods into consecutive holders provided on said first conveyor means.

12. In an apparatus for making and manipulating filter cigarettes in which cigarette rods of multiple unit length are fed consecutively into axially extending pockets provided in the periphery of a first rotary conveyor, in combination, means for severing consecutive rods in the pockets of said conveyor so that the rods yield rows of aligned shorter rods; a second conveyor comprising sets of pairwise arranged conical drums mounted to rotate about axes which are inclined with reference to each other and with reference to the axis of said rotary conveyor, each set of conical drums having peripheral pockets arranged to receive and to advance one shorter rod of each row of shorter rods in a path which diverges from the path of the other set of conical drums so that the distance between the shorter rods which form such rows increases while the shorter rods move away from the first conveyor; a third rotary conveyor having peripheral pockets arranged to receive rows of shorter rods from said second conveyor so that successive pockets of said third conveyor receive rows of shorter rods which are spaced axially with reference to each other; means for inserting filter mouthpieces of double unit length between the axially spaced shorter rods in consecutive pockets of said third conveyor; and means for moving the shorter rods in consecutive pockets of said third conveyor toward each other so that the shorter rods come in abutment with the respective filter mouthpieces.

References Cited

UNITED STATES PATENTS

| | | | |
|---|---|---|---|
| 2,124,397 | 7/1938 | Gwinn et al. | 198—24 |
| 2,740,409 | 4/1956 | Korber | 131—94 |
| 2,858,046 | 10/1958 | Pollmann | 131—94 X |
| 2,920,631 | 1/1960 | Korber | 131—94 |
| 2,988,198 | 6/1961 | Pinkham | 198—32 |
| 3,036,581 | 5/1962 | Dearsley | 131—94 |
| 3,039,367 | 6/1962 | Stelzer | 131—94 X |

FOREIGN PATENTS

| | | |
|---|---|---|
| 783,760 | 4/1935 | France. |
| 256,330 | 2/1913 | Germany. |
| 100,932 | 8/1923 | Switzerland. |

ALDRICH F. MEDBERY, *Primary Examiner.*